(12) United States Patent
Belanger

(10) Patent No.: US 6,557,807 B1
(45) Date of Patent: May 6, 2003

(54) ROTATABLE PIPE AND CONDUIT HANGER

(76) Inventor: Lionel Belanger, E. Shore Rd., E. Waterboro, ME (US) 04087

( * ) Notice: Subject to any disclaimer, the term of this patent is extended or adjusted under 35 U.S.C. 154(b) by 28 days.

(21) Appl. No.: 10/082,189

(22) Filed: Feb. 26, 2002

(51) Int. Cl.[7] ............................................... A47B 96/06
(52) U.S. Cl. ........................ 248/215; 248/58; 248/72; 248/339
(58) Field of Search ................... 248/339, 340, 248/341, 317, 322, 307, 228.3, 228.1, 225.21, 215, 489, 490, 58, 544, 228.4, 327, 59, 61, 72; 52/713

(56) References Cited

U.S. PATENT DOCUMENTS

| | | | | |
|---|---|---|---|---|
| 1,107,686 A | * | 8/1914 | Mehrmann | 248/495 |
| 3,424,422 A | * | 1/1969 | Klangos | 242/379.2 |
| 4,273,436 A | * | 6/1981 | Drell | 248/339 |
| 4,826,113 A | * | 5/1989 | Winters | 248/228.3 |
| 4,973,021 A | * | 11/1990 | Schuite | 248/215 |
| 5,480,116 A | * | 1/1996 | Callas | 248/228.4 |
| 5,553,823 A | * | 9/1996 | Protz, Jr. | 248/215 |
| 6,119,999 A | * | 9/2000 | Fleishman | 248/340 |

* cited by examiner

Primary Examiner—Ramon O. Ramirez
Assistant Examiner—Tan Le

(57) ABSTRACT

A two-part pipe and cable rotary hanger includes a first U-shaped end for engaging within slots formed in ceiling struts and an opposite end arranged for receiving a hook-shaped support arm. A wing-shaped adapter attaches to a ceiling I-beam and receives the rotary hanger along a center portion thereof.

4 Claims, 4 Drawing Sheets

ROTATABLE PIPE AND CONDUIT HANGER

BACKGROUND OF THE INVENTION

The invention relates to means for hanging pipes, conductors, cables and the like in industrial environments.

Various hook-shaped hangers are currently available for supporting pipes in accordance with both state and local safety codes.

One cable support arrangement is described, for example, in U.S. Pat. No. 5,961,081 entitled "Cable Support Having Pivotally and Slidable Retainer". This support arrangement can be fixedly attached to a beam support or the like.

U.S. Pat. No. 5,542,631 entitled "Adjustable Pipe Hanger" discloses a pipe hanger arranged for attachment to a ceiling beam that allows the hanger to be raised and lowered in the vertical plane as well as limited rotation in the horizontal plane.

One example of a wire and cable support that is engagable with a support cable that allows movement of the support along the cable in the horizontal plane is found within U.S. Pat. No. 5,957,416 entitled "Wire and Cable Support System".

However, when such pipes and conduits are to be temporarily connected with existing I-beams and interconnecting ceiling struts, it is often convenient to attach the pipes and conduits to the existing I-beams and struts by using duct tape and/or bailing wire, which is later removed. The use of such tape and/or wire limits the movement of the pipes and conduits in the vertical and horizontal plane.

One purpose of the instant invention is to disclose adjustable hook shaped hangers that can be temporarily connected to both I-beams and ceiling struts, for pipe and conduit support without having to tape or tie the pipe or conduit to the I-beams or ceiling struts while allowing movement of the pipe or conduit without having to disconnect the pipe or conduit, and without having to remove the hangers from the I-beams or struts.

SUMMARY OF THE INVENTION

A two-part pipe and cable rotary hanger includes a first U-shaped section having one end adapted for engaging within slots formed in ceiling struts and an opposite end arranged for receiving a hook-shaped support arm. A further embodiment includes a wing-shaped adapter that attaches to a ceiling I-beam and receives the rotary hanger along a center portion thereof.

DESCRIPTION OF THE PREFERRED EMBODIMENT

Figure 1:
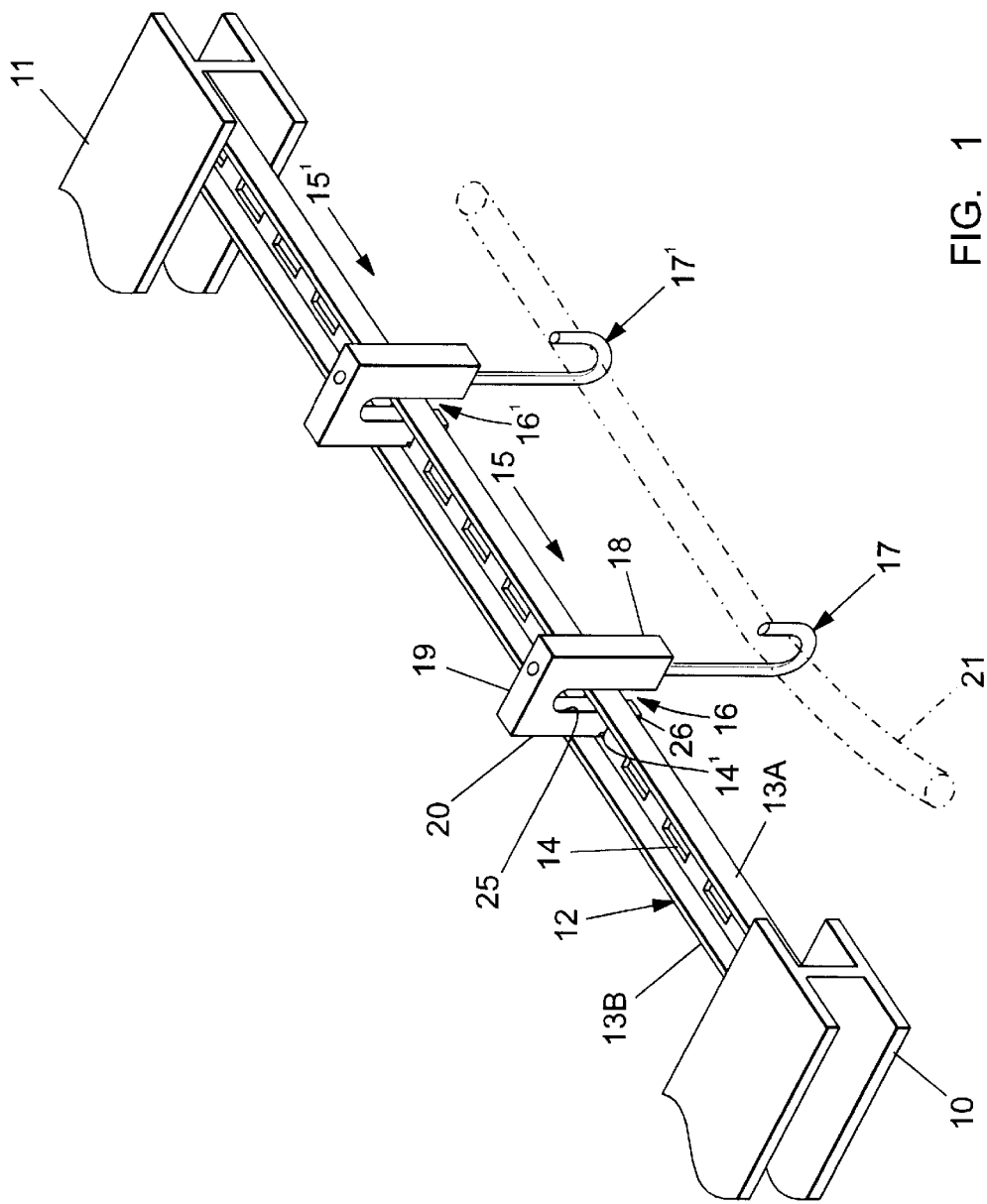
FIG. 1 is a top perspective view of a pair of ceiling I-beams interconnected with a ceiling strut and a pair of the rotary hangers connected with the ceiling strut to support a pipe as depicted in phantom.

A pair of rotator hangers 15, 15' are shown in FIG. 1 in the form of a C-shaped connector 16 connected with a ceiling strut 12 interconnecting between a pair of ceiling I-beam supports 10, 11 commonly employed within industrial environments. Struts can also be self-supported by means of threaded rods extending downward from the ceiling. In accordance with Federal regulatory codes, pipes, cables, conduits and the like must be supported at a height of at least seven feet from the floor of a work place. The conduit pipe 21, shown in phantom, sits within the U-shaped hooks 17, 17' extending from the pair of rotator hangers 15, 15' in accordance with the invention. The rotator hangers connect with the strut 12 by insertion of the end 26 of the connector block 20 through one of the strut slots 14 as indicated at 14' in the bottom of the strut intermediate the upstanding strut sidewalls 13A, 13B. The C-shaped connector 16 includes a bight 19 defining a support slot 25 for clearance between the support block 18 that carries the U-shaped hook 17 and the strut sidewall 13A such that the hook 17 is free to rotate in the horizontal plane without coming into contact with the strut 12. The ability to rotate the hook 17 180 degrees within the support block 18 is an important feature of the invention for allowing movement of the conduit pipe 21 along the hooks without incurring undue stress upon the support block 18.

Figure 2:
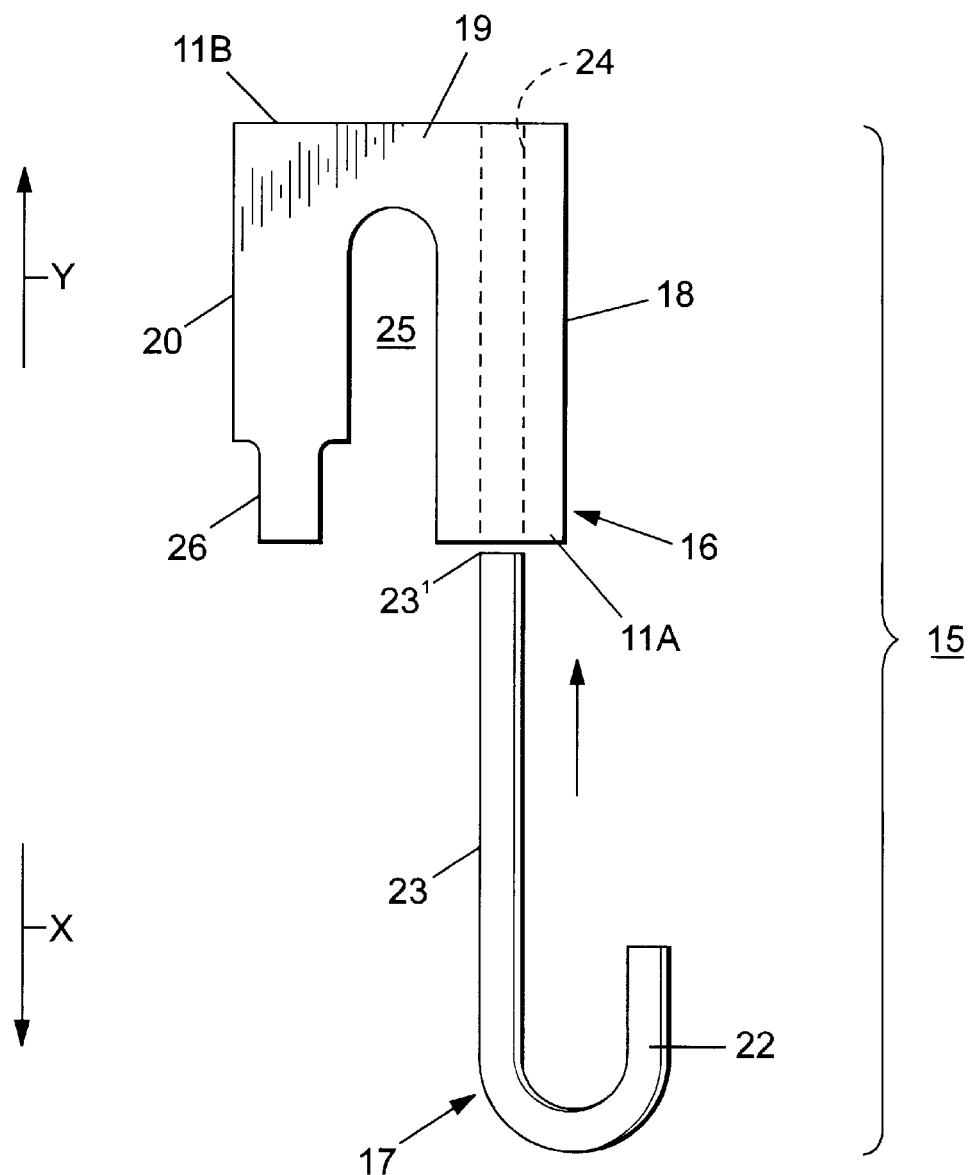
FIG. 2 is an enlarged side view of the rotary hanger shown in FIG. 1 with the C-shaped connector in isometric projection with the U-shaped hook.

The arrangement between the support block 18 and the hook 17 is best seen by now referring to FIG. 2. The block 18 is shaped from Celtec PVC; obtained from Vycom Inc. having excellent chemical and electrical resistant properties. "Celtec is a registered trademark of Vycom for its PVC foam material. The hook 17 is formed from solid PVC piping material obtained in cylindrical form from Plastic Supply Inc., for example.

The support block 18 is in the form of a C-shaped connector 16 defining the support block 18 and connector block 20 joined by the bight 19 to form the support slot 25 for the purpose described earlier with reference to FIG. 1. The bottom end 26 of the support block 20 has a reduced dimension to provide for clearance fit relation within the strut slot 14, shown in FIG. 1, to allow for some limited movement of the end 26 within the slot without producing undue strain on the support block, as described earlier. The thru-slot 24 is formed within the support block 18 for receiving the extended leg 23 of the U-shaped hook 17 in clearance-fit relation whereby the hook end 22 is positioned a fixed distance from the bottom 11A of the support block 11. When the extend leg 23 is positioned within the slot 24, the end 23', protrudes beyond the top 11B of the support block, and is peened over to retain the U-shaped hook within the support block 18. This arrangement prevents movement of the hook end 22 in the downward direction, as indicated at X while allowing movement of the hook end in the upward direction as indicated at Y, to allow complete rotation of the U-shaped hook 17 within the support block 18 without incurring undue stress upon the rotary hanger 15. The rotation feature of the U-shaped hook 17 is an important feature of the invention for allowing transfer and positioning of the pipe 21 (FIG. 1) without damage to the pipe, strut 12 or rotary hanger 15, in the process.

Figure 3:
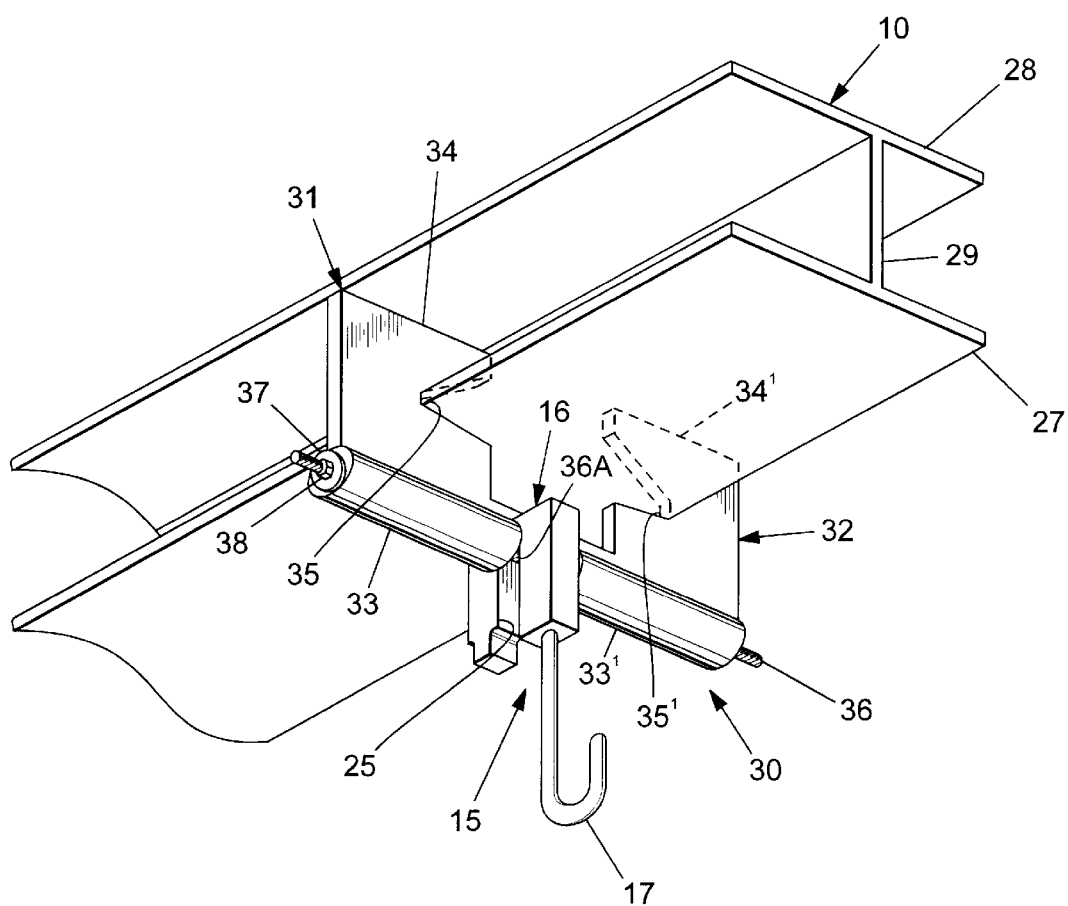
FIG. 3 is a front perspective view of a ceiling I-beam connected with the adapter and rotary hanger in accordance with the invention.

When the struts 12 of FIGS. 1 and 2 are not available, the rotary hanger 15 can be attached to the I-beam 10 by means of the adapter 30 in the manner shown by now referring to FIG. 3. The I-beam is of the type consisting of a pair of bottom and top steel plates 27, 28 joined by a connecting beam or plate 29. The wing-shaped adapter 30, formed from a solid PVC material similar to that used to form the U-shaped hook 17 of FIGS. 1 and 2, includes a pair of slotted sidepieces 31, 32 having cylindrical and rectangular sidepieces 33, 33' and 34, 34' connects with the bottom plate 27 by means of the pair of V-shaped slots 35, 35' joined by a threaded extending bolt 36. The center bolt 36 is fastened in place by means of the washer 37 and hexagonal nut 38. The center portion 36A, of the extending bolt 36, receives the support slot 25 formed within the C-shaped connector 16 to position the U-shaped hook 17 in operative position under the I-beam 10.

Figure 4:
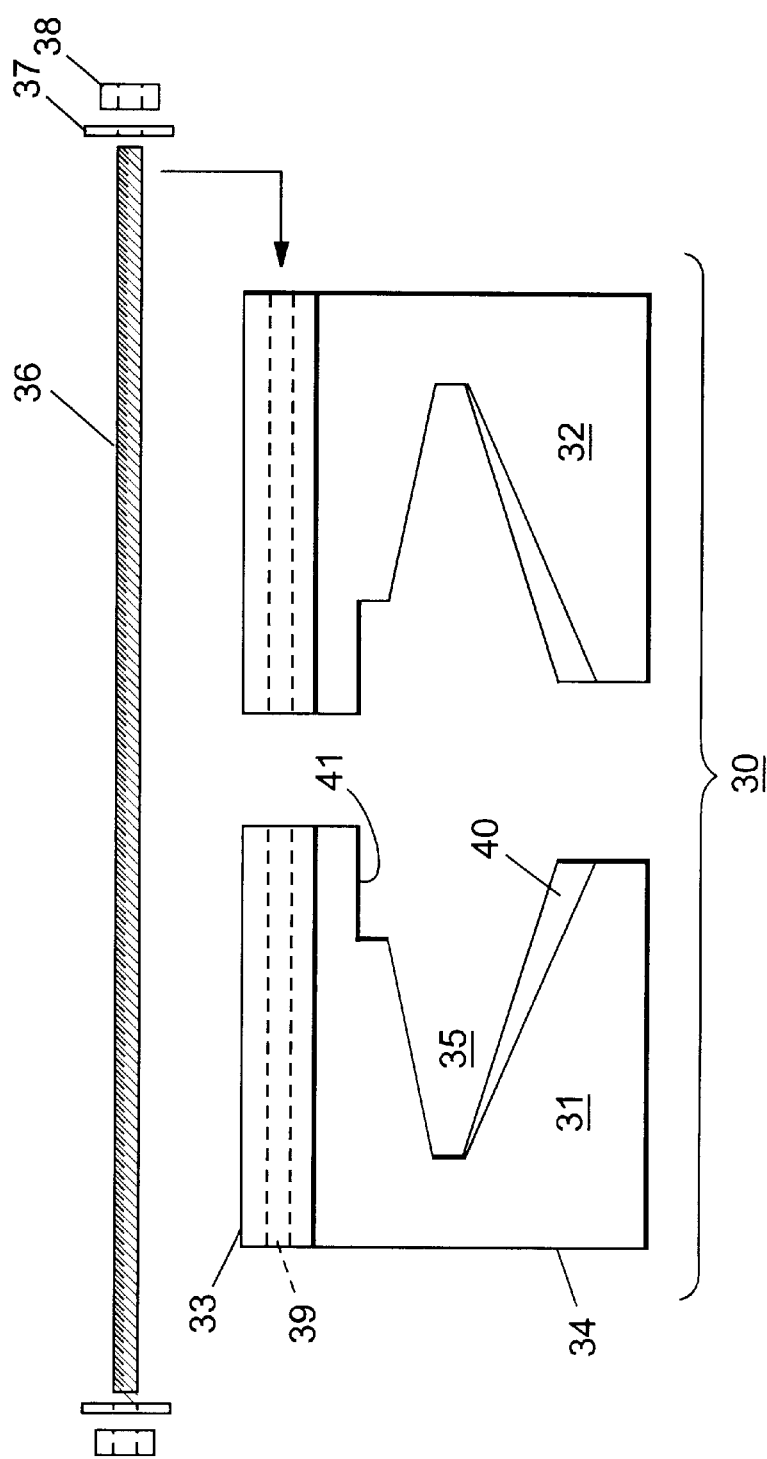
FIG. 4 is an enlarged side view of the slotted side pieces and extended bolt comprising the adapter depicted in FIG. 3.

The wing-shaped adapter 30 is shown in FIG. 4 to detail the arrangement of the slotted sidepieces 31, 32, having cylindrical sidepieces 33 each of which include an extended slot 39 for accepting the extended threaded bolt 36, washer 37 and bolt 38 in the manner described earlier. The V-shaped slots 35 formed within the rectangular side 34 terminates at an off-set end 41 at the top thereof to accommodate the edge of the bottom plate 27 of the I-beam 10, of FIG. 1 and includes a slanted support ridge 40, along the bottom for added strength.

A rotatable hanger for pipes, conduits, cables and the like used for water transport, temporary electric supply and welding function has herein been described for direct attachment to ceiling struts and for attachment to ceiling I-beams by means of an adapter. The hanger allows the pipes to be moved horizontally and vertically without having to disconnect the hanger from the strut or I-beam support.

What is claimed is:

1. A two-part hanger for supporting pipes, cables and conduits from a ceiling support comprising:

a first part consisting of a C-shaped connector having a support block at one side for positioning on a support piece and a connector block at an opposite side of said support block, said connector block having a connector slot extending there through, said support block and said connector block defining a support slot there between for arranging on said support piece; and a second part consisting of a hook-shaped support arm having a hook at one end for receiving an object of support and a leg member extending from said hook and passing through said connector slot for rotatable attachment of said hook-shaped support arm to said C-shaped connector to thereby allow rotation of said hook-shaped support arm independent of said C-shaped connector.

2. A hanger for supporting pipes, cables and conduits from a ceiling support comprising:

a C-shaped connector having a support block at one side for positioning on a support piece;

a connector block at an opposite side of said support block, said connector block having a connector slot extending there through, said support block and said connector block defining a support slot there between for arranging on said support piece;

a U-shaped hook member having a hook at one end for receiving an object of support and a leg member extending from said hook and passing through said connector slot for rotatable attachment of said U-shaped hook member to said C-shaped connector to thereby allow rotation of said hook-shaped support arm independent of said C-shaped connector; and an end on said leg member extending beyond said connector block and being flattened for preventing removal of said U-shaped hook member from said C-shaped connector.

3. A hanger for supporting pipes, cables and conduits from a ceiling support comprising:

a C-shaped connector having a support block at one side for positioning on a support piece said C-shaped connector comprising foam PVC material;

connector block at an opposite side of said support block, said connector block having a connector slot extending there through, said support block and said connector block defining a support slot there between for arranging on said support piece; and a U-shaped hook member having a hook at one end for receiving an object of support and a leg member extending from said hook and passing through said connector slot for rotatable attachment of said U-shaped hook member to said C-shaped connector to thereby allow rotation of said hook-shaped support arm, said U-shaped hook member comprises solid PVC material.

4. An adapter for connecting a hanger for supporting pipes, cables and conduits to a ceiling support comprising:

a pair of first and second sidepieces, each of said sidepieces including means for receiving an extended fastener sized to connect said sidepieces together and to provide a support slot there between opposing edges of said sidepieces; and a V-shaped slot formed within each of said sidepieces, said V-shaped slot being sized to receive a part of a ceiling support, said V-shaped slot defining a top edge and a bottom edge, said top edge being off-set for accommodating said part of a ceiling support.

* * * * *